(12) United States Patent
Buchholz et al.

(10) Patent No.: US 7,011,198 B2
(45) Date of Patent: Mar. 14, 2006

(54) DEVICE FOR REGULATING ROTATIONAL SPEED OF THE DRIVEN ROTOR OF A VISCOSITY COUPLING

(75) Inventors: Thomas Buchholz, Meersburg (DE); Wolfgang Sorg, Horgenzell (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/782,199

(22) Filed: Feb. 19, 2004

(65) Prior Publication Data

US 2005/0023100 A1 Feb. 3, 2005

(30) Foreign Application Priority Data

Feb. 19, 2003 (DE) ................................. 103 07 106

(51) Int. Cl.
*F16D 48/06* (2006.01)
(52) U.S. Cl. ................................. 192/58.61; 192/103 F
(58) Field of Classification Search ............... 192/58.6, 192/58.61, 58.62, 103 R, 103 F; 477/903; 701/67, 68; 123/41.11
See application file for complete search history.

(56) References Cited

U.S. PATENT DOCUMENTS

| | | | | | |
|---|---|---|---|---|---|
| 4,228,880 | A | * | 10/1980 | Gee ........................ | 192/58.61 |
| 4,650,045 | A | * | 3/1987 | Weible et al. ........... | 192/58.61 |
| 4,846,325 | A | * | 7/1989 | Mohan ..................... | 192/58.61 |
| 5,030,865 | A | * | 7/1991 | Rockey et al. ................. | 310/78 |
| 5,224,446 | A | * | 7/1993 | Okita et al. .............. | 123/41.12 |
| 5,584,371 | A | * | 12/1996 | Kelledes et al. ......... | 192/58.61 |
| 5,799,765 | A | * | 9/1998 | Ono et al. ............... | 192/58.62 |
| 6,079,536 | A | * | 6/2000 | Hummel et al. ......... | 192/58.62 |
| 6,648,115 | B1 | * | 11/2003 | Smith et al. ................ | 192/21.5 |

FOREIGN PATENT DOCUMENTS

DE    100223 911 A1    5/2001

* cited by examiner

*Primary Examiner*—Saul Rodriguez
(74) *Attorney, Agent, or Firm*—Greg Dziegielewski, Esq.; Artz & Artz, P.C.

(57) ABSTRACT

Regulating the rotational speed of the driven rotor of a viscosity coupling to a predetermined speed with a control circuit having a switching mechanism. When the speed drops below certain values, the speed is adjusted back to the predetermined value.

12 Claims, 1 Drawing Sheet

DEVICE FOR REGULATING ROTATIONAL SPEED OF THE DRIVEN ROTOR OF A VISCOSITY COUPLING

TECHNICAL FIELD

The invention relates to a device for regulating the rotational speed of the driven rotor of a viscosity coupling of a motor vehicle cooling system, in particular of a fan of the cooling system.

BACKGROUND OF THE INVENTION

In motor vehicle cooling systems, viscosity couplings, that is to say liquid friction couplings, are employed, to couple driven parts of the cooling system, in particular a fan, to the vehicle engine and drive them by means of the latter. To keep the rotational speed of the driven rotor of the viscosity coupling, for example the fan, at an optimal value, the quantity of effective shearing liquid supplied to the viscosity coupling is controlled by way of a setting unit, for example a valve.

U.S. Pat. No. 6,079,536 discloses regulating the rotational speed of the driven rotor of a viscosity coupling by means of a regulator that supplies the setting unit with a setting signal dependent on a measured actual rotational speed.

The object of the invention is so to improve known devices and to achieve higher dependability in operation.

This object is accomplished according to the present invention.

SUMMARY OF THE INVENTION

According to an embodiment of the invention, the rotational speed of the driven rotor of the viscosity coupling is regulated, in the first place, in a control circuit ("closed loop control") in known manner, the measured actual rotational speed being regulated to a preassigned target speed. In addition to this control circuit, the rotational speed can also be controlled to the preassigned target speed ("open loop control"). For this purpose, the setting unit is supplied with the setting signal by way of a switch unit switchable between two positions. In the first position of the switch, the setting unit is supplied with the setting signal of the regulator, so that the rotational speed of the driven rotor is regulated to the preassigned value. In the second switch position, the setting unit is supplied with a preassigned setting signal, so that the rotational speed is controlled to the preassigned target value, without any feedback of a measured actual speed. The switch unit switches automatically into the second position when no measurement of the actual speed of the driven rotor is present.

The device according to this embodiment of the present invention results in an improved operating dependability of the cooling system. So long as the operation of the circuit is trouble-free, the rotational speed and with it the cooling of the system is regulated to the preassigned optimal value. If the actual speed value drops out, for example because the sensor measuring the actual speed is defective, then the device switches from regulation to control, so that continued function of the cooling system is assured even if not regulated exactly to optimum conditions.

In many applications, such as are described for example in U.S. Pat. No. 6,079,536 as well, a cascaded regulation of the viscosity clutch takes place. In a first temperature regulator, a target speed is calculated from the measured actual temperature of the cooling system and the operating conditions of the vehicle engine. A following speed regulator regulates the actual speed of the driven rotor of the viscosity clutch to the target speed. In such an embodiment, the invention results in the additional advantage that the calculation of the target speed can be carried out in the temperature regulator in exactly the same manner and with the same software, no matter whether there is a following speed regulation or not. If an actual speed measurement of the driven rotor of the viscosity clutch is present at the vehicle cooling system, then the speed is regulated by way of the regulator according to the invention. If the motor vehicle cooling system does not exhibit such an actual speed measurement, then the switch unit switches automatically into control mode, and the speed is controlled to the target value preassigned by the temperature control. The control circuit here remains out of operation. This offers the advantage to the engine manufacturer that the same device and the same software may be employed for viscosity couplings having an actual speed measurement and for those without such an actual speed measurement.

BRIEF DESCRIPTION OF THE DRAWINGS

In the following, an embodiment of the present invention will be illustrated in more detail in terms of FIG. 1 by way of example.

DESCRIPTION OF PREFERRED EMBODIMENTS

Figure 1:
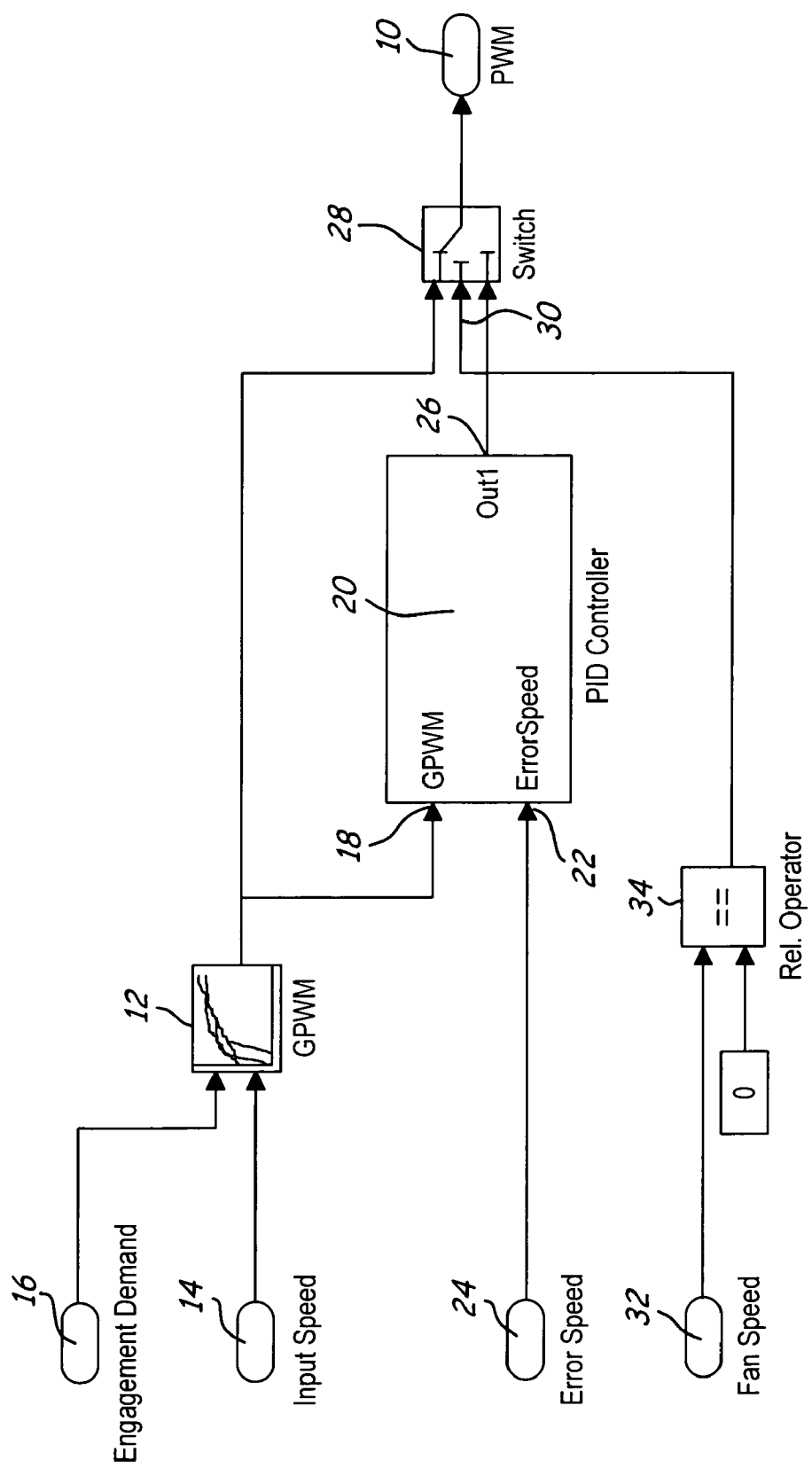
FIG. 1 schematically depicts a device for regulating the rotational speed of the driven rotor of a viscosity coupling.

The fan of a motor vehicle cooling system is driven by the vehicle engine by way of a viscosity coupling (liquid friction coupling). The rotational speed of the fan is regulated by the engagement of the viscosity coupling. For this purpose, the flow of shearing liquid supplied to the working chamber of the viscosity coupling, and hence taking effect, is controlled by way of a setting unit, for example a valve unit. The setting unit is controlled by a setting signal, in particular by a pulse-width-modulated (PWM) timed signal, to regulate the speed to the target preassigned by the temperature regulator.

As shown in FIG. 1, a control diagram 12 is supplied with engine data, for example the engine speed 14 (input speed), and an engagement demand 16. By reference to the stored diagram 12, a pulse width-modulated target speed setting signal GPWM is calculated from these quantities. This target speed signal GPWM is supplied to an input 18 of a fast regulator 20, configured as a PID regulator. By way of another input 22, the regulator 20 is supplied with a speed deviation ("error speed") signal 24. This speed deviation signal 24 corresponds to the deviation of the actual speed of the driven rotor of the viscosity coupling as measured by means of a sensor from the GPWM target speed. The regulator 20 adapts the supplied setting signal GPWM by way of its P-, I-, D-function until the deviation ("error speed") is zero. This adapted setting signal is emitted by the regulator 20 by way of its output 26 as setting signal for the setting unit.

Ahead of the setting unit, a switch unit ("switch") 28 is arranged, comprising two switch positions. In a first switch position, the setting signal coming from output 26 of the regulator 20 is supplied to the setting unit. In a second switch position, shown in the drawing, the target speed setting signal GPWM of the diagram 12 is supplied directly by way of a by-pass line bridging over the regulator 20 to the setting unit.

The switch unit 28 is switched between the first switch position and the second switch position by way of a control input 30. For this purpose, the actual speed signal 32 ("fan speed") measured by the sensor at the driven rotor of the viscosity coupling is supplied to a difference operation amplifier 34 ("Rel. Operator"). The difference operation amplifier 34 ascertains by comparison with a null level whether an actual speed signal 32 is present or not. If the actual speed signal 32 is present, then the difference operation amplifier 34 switches the switch unit 28 into the first switch position, so that the closed control circuit of the regulator 20 becomes active, regulating the speed of the driven rotor of the viscosity clutch to the GPWM target speed. If the difference operation amplifier 34 finds no actual speed signal 32, then the difference operation amplifier 34 switches the switch unit 28 to the second switch position, in which the regulator 20 is by-passed and the setting unit is controlled according to the GPWM target speed of the control diagram 12.

If the viscosity coupling comprises a sensor for measuring the rotational speed of its driven rotor, then the speed can be regulated to the preassigned target value by way of the closed circuit of the regulator 20. If the sensor drops out, then the device automatically switches and controls the speed of the viscosity coupling to the preassigned target value. If the device addresses a viscosity coupling not comprising a sensor for measuring the actual rotational speed of the driven rotor of the viscosity coupling, then no actual speed signal 32 is found, and the device operates automatically without the circuit of the regulator 20.

While various embodiments of the invention have been shown and described, numerous variations and alternate embodiments will occur to those skilled in the art. Accordingly, it is intended that the invention be limited only in terms of the appended claims.

What is claimed is:

1. A device for regulating the rotational speed of a driven rotor of a viscosity coupling of a motor vehicle cooling system and having a setting means that controls liquid flow supplied to the viscosity coupling in accordance with a setting signal, and having a regulator that supplies the setting unit with said setting signal depending on the deviation of a measured actual speed value from a target speed value, characterized in that the setting unit is supplied with said setting signal by a switch unit switchable between a first switch position in which said setting signal of the regulator is supplied and a second switch position in which a target speed setting signal is supplied, and in that the switch unit is switched automatically from the first switch position into the second switch position when no measured actual speed value is present.

2. The device according to claim 1, wherein a control diagram calculates said target speed setting signal from operating data of the motor vehicle, and said target speed setting signal is fed firstly to said regulator and secondly, to said setting unit by the switch unit in its second switch position.

3. The device according to claim 1, wherein an operation amplifier ascertains the presence or absence of the actual speed signal and switches said switch unit.

4. The device according to claim 2, wherein an operation amplifier ascertains the presence or absence of the actual speed signal and switches said switch unit.

5. A system for regulating the speed of the driven rotor of a viscous coupling of motor vehicle cooling system, said system comprising:
   a setting member for controlling the liquid flow supplied to the viscous coupling in accordance with a setting signal;
   a regulator for supplying said setting member with said setting signal and depending on the deviation of a measured actual speed value from a target speed value;
   a switch unit having a first position for supplying said setting signal to said regulator and a second position for supplying a target setting signal;
   said switch unit automatically switching from said first position to said second position when no measured actual speed value is present.

6. A system for regulating the speed of a viscosity clutch, said viscosity clutch having a shearing liquid, said system comprising:
   means for calculating a pulse width-modulated target speed setting signal (GPWM);
   means for calculating a speed deviation signal;
   a regulator for receipt of said GPWM and speed deviation signal and emitting a setting signal;
   a setting unit for receipt of either said setting signal or said GPWM; and
   a switching member for supplying either said setting signal or said GPWM to said setting unit;
   wherein said setting unit controls the flow of shearing liquid to said viscosity clutch.

7. A process for regulating the speed of a viscosity clutch, said viscosity clutch having a driven rotor and shearing liquid, said method comprising the steps of:
   calculating a pulse-width modulated target speed setting signal (GPWM);
   calculating a speed deviation signal;
   supplying said GPWM and said speed deviation signal to a regulator;
   supplying either a setting signal from said regulator or said GPWM to a setting unit through a switching mechanism; and
   controlling the flow of shearing liquid in said viscosity clutch thereby regulating the speed of said viscosity clutch.

8. The process as set forth in claim 7 wherein said speed deviation signal corresponds to the deviation of the actual speed of said driven rotor of said viscosity clutch as measured by a sensor.

9. The process as set forth in claim 7 wherein said step of calculating said GPWM comprises supplying operating engine data to a stored diagram.

10. The process as set forth in claim 9 wherein said engine data includes the engine speed and an engagement demand.

11. The process as set forth in claim 7 further comprising determining the presence or absence of a speed signal and thereby switching said switching mechanism.

12. The process as set forth in claim 11 wherein said presence or absence of the speed signal is determined by an operation amplifier.

* * * * *